United States Patent
Gopal et al.

(10) Patent No.: US 11,128,670 B2
(45) Date of Patent: Sep. 21, 2021

(54) METHODS, SYSTEMS, AND COMPUTER READABLE MEDIA FOR DYNAMICALLY REMEDIATING A SECURITY SYSTEM ENTITY

(71) Applicant: Oracle International Corporation, Redwood Shores, CA (US)

(72) Inventors: Rajat Gopal, Shrewsbury, MA (US); Cheng Liu, Acton, MA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 174 days.

(21) Appl. No.: 16/286,508

(22) Filed: Feb. 26, 2019

(65) Prior Publication Data
US 2020/0274902 A1 Aug. 27, 2020

(51) Int. Cl.
*H04L 29/06* (2006.01)

(52) U.S. Cl.
CPC ........ *H04L 63/205* (2013.01); *H04L 63/0209* (2013.01); *H04L 63/1408* (2013.01)

(58) Field of Classification Search
CPC ............. H04L 63/205; H04L 29/12462; H04L 61/255; G06F 16/20; G06F 1/00; G06F 16/22
USPC ........................................................... 726/1
See application file for complete search history.

(56) References Cited

U.S. PATENT DOCUMENTS

| | | | | |
|---|---|---|---|---|
| 5,991,879 A | * | 11/1999 | Still | G06F 21/6218 710/240 |
| 6,473,400 B1 | * | 10/2002 | Manning | H04L 43/00 370/229 |
| 6,760,775 B1 | * | 7/2004 | Anerousis | H04L 29/06 709/229 |

(Continued)

FOREIGN PATENT DOCUMENTS

| WO | WO 2011/0115856 A2 | | 9/2011 | |
|---|---|---|---|---|
| WO | WO-2011115856 A2 | * | 9/2011 | ......... H04L 63/0236 |
| WO | WO 2020/185782 A1 | | 9/2020 | |

OTHER PUBLICATIONS

Notification of Transmittal of the International Search Report and the Written Opinion of the International Searching Authority, or the Declaration for International Application Serial No. PCT/US2020/021898 (dated Jun. 16, 2020).

(Continued)

*Primary Examiner* — Ondrej C Vostal
(74) *Attorney, Agent, or Firm* — Jenkins, Wilson, Taylor & Hunt, P.A.

(57) ABSTRACT

A method for dynamically remediating a security system entity includes establishing a security score for a security system entity (SSE) supporting a trusted network based on a security policy configuration of the SSE. The method further includes receiving, by the SSE, ingress network traffic flows directed to the trusted network and determining an updated security score for the SSE based on the security policy configuration of the SSE and the ingress network traffic flows that are permitted into the trusted network via the SSE. The method also includes remedying the security (Continued)

policy configuration of the SSE if the updated security score differs from the baseline security score by a predefined amount.

17 Claims, 4 Drawing Sheets

(56) References Cited

U.S. PATENT DOCUMENTS

| | | | |
|---|---|---|---|
| 6,781,990 B1* | 8/2004 | Puri | H04L 45/00 370/392 |
| 9,973,540 B2* | 5/2018 | Li | H04L 63/1425 |
| 10,075,466 B1* | 9/2018 | Oliphant | H04L 63/1433 |
| 2004/0025173 A1* | 2/2004 | Levonai | H04L 41/12 719/328 |
| 2004/0054925 A1* | 3/2004 | Etheridge | H04L 63/1458 726/22 |
| 2005/0119905 A1* | 6/2005 | Wong | G06Q 10/06 705/50 |
| 2005/0154979 A1* | 7/2005 | Chidlovskii | G06F 40/154 715/237 |
| 2005/0198099 A1* | 9/2005 | Motsinger | G06F 21/55 709/200 |
| 2008/0151779 A1* | 6/2008 | Johnson | H04L 69/32 370/254 |
| 2009/0024663 A1* | 1/2009 | McGovern | G06F 21/577 |
| 2009/0116573 A1* | 5/2009 | Gaal | H04L 5/0053 375/267 |
| 2010/0071035 A1* | 3/2010 | Budko | H04L 63/08 726/4 |
| 2012/0304277 A1* | 11/2012 | Li | H04L 63/0281 726/12 |
| 2013/0034022 A1* | 2/2013 | Yen | H04L 41/022 370/255 |
| 2015/0040231 A1* | 2/2015 | Oliphant | G06F 21/57 726/25 |
| 2018/0351970 A1* | 12/2018 | Majumder | H04L 63/061 |
| 2018/0352004 A1* | 12/2018 | Leung | H04L 63/0272 |
| 2019/0035027 A1* | 1/2019 | Ng | H04L 63/20 |
| 2020/0296136 A1 | 9/2020 | Liu et al. | |
| 2021/0141351 A1* | 5/2021 | Yang | G05B 19/042 |

OTHER PUBLICATIONS

Notification of Transmittal of the International Search Report and the Written Opinion of the International Searching Authority, or the Declaration for International Application Serial No. PCT/US2020/014017 (dated Apr. 23, 2020).

Commonly-assigned, co-pending U.S Appl. No. 16/354,121 for "Methods, Systems, and Computer Readable Media For Utilizing a Security Service Engine to Assess Security Vulnerabilities on a Security Gateway Element," (Unpublished, filed Mar. 14, 2019).

* cited by examiner

METHODS, SYSTEMS, AND COMPUTER READABLE MEDIA FOR DYNAMICALLY REMEDIATING A SECURITY SYSTEM ENTITY

TECHNICAL FIELD

The subject matter described herein relates to dynamically assessing network traffic flows to remediate security systems associated with enterprise networks. More particularly, the subject matter described herein relates to methods, systems, and computer readable media for dynamically remediating a security system entity.

BACKGROUND

At present, enterprise networking application security systems largely rely on security policies that are defined to be enforced on a network function or an application server that is tasked to protect trusted networks, such as enterprise network environments. Notably, the use of security systems in this manner involves the utilization of configuration management and log and event analysis. However, these techniques frequently are unable to distinguish between instances where a security system device has been reconfigured intentionally, accidentally, or maliciously. Further, even when a change in the configuration of the security system is intentional, it is not always clear if such changes will result a more secure system or not.

Accordingly, there exists a need for methods, systems, and computer readable media for dynamically remediating a security system entity.

SUMMARY

The subject matter described herein includes a methods, systems, and computer readable media for dynamically remediating a security system entity. One method includes establishing a security score for a security system entity (SSE) supporting a trusted network based on a security policy configuration of the SSE. The method further includes receiving, by the SSE, ingress network traffic flows directed to the trusted network and determining an updated security score for the SSE based on the security policy configuration of the SSE and the ingress network traffic flows that are permitted into the trusted network via the SSE. The method also includes remedying the security policy configuration of the SSE if the updated security score differs from the baseline security score by a predefined amount.

A system for dynamically remediating a security system entity includes a security system entity (SSE) comprising at least one processor and memory. The system further includes a security assessment engine (SAE) stored in the memory and when executed by the at least one processor is configured for establishing a baseline security score for the SSE supporting a trusted network based on a security configuration of the SSE, processing ingress network traffic flows directed to the trusted network via the SSE, determining an updated security score for the SSE based on the security configuration of the SSE and the ingress network traffic flows that are permitted into the trusted network via the SSE, and remedying the security configuration of the SSE if the updated security score differs from the baseline security score by a predefined amount. As used herein, a network traffic flow (e.g., a packet flow or network flow) comprises a sequence of packets (or frames) communicated from a source computer to a destination, which may be another host, a multicast group, or a broadcast domain. In some embodiments, a network traffic flow may be characterized by containing similar source Internet protocol (IP) address and port numbers and similar destination IP address and port numbers.

The subject matter described herein may be implemented in hardware, software, firmware, or any combination thereof. As such, the terms "function" "node" or "engine" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Methods, systems, and computer readable media for dynamically remediating a security system entity (SSE) are disclosed. In some embodiments, the disclosed subject matter includes the generation of a security score of a security system device (e.g., an SSE) through the use of the dynamic analysis of the system's security configuration and processed network traffic flows in order to detect when the security score of the SSE changes. Instead of focusing on system monitoring to assess an SSE's integrity or level of security, the disclosed subject matter focuses on the processed network traffic flows that enter and subsequently leaves the SSE. Specifically, the disclosed SSE employs a security assessment engine (SAE) that includes statistical mechanisms to determine which security configuration and/or underlying security policies would result in the observed network traffic that is permitted to traverse and leave a monitoring SSE. In addition, the disclosed SAE is configured to calculate an overall security system score that indicates how secure the SSE is with regard to ensuring a desired network configuration and allowing particular network traffic flows. Notably, the disclosed SSE and SAE are utilizing network traffic flows to automatically detect a change in the security system configuration and/or a change in security policies in response to new traffic flow inputs that were missed by previously established baseline security configurations and security policies employed by the SSE.

The security score system described herein utilizes a number of key data characteristics. Notably, the following terms described herein serve to define several key characteristics associated with network traffic flows processed by the SSE. For example, as used here in a "user" is an authenticated identity that sends or consumes traffic data. In situations where no authentication is involved, the user is considered as being anonymous. Similarly, a "user device" as described herein is a system utilized by the user to send or receive network traffic flows over the network. In some embodiments, a user device may include any device that is utilized directly by a mobile subscriber end-user to receive or transmit data, such as a hand-held smart phone, a GSM mobile station, a laptop computer equipped with a mobile broadband adapter, or any other like device. A "network" can include any network system where the user resides to communicate and is generally identified by Internet protocol (IP) addresses, protocols, ports, and virtual local area networks (VLANs). An "application" generally refers to the software application and/or tools used by the user for communication. As used herein, a "location" specifies where network traffic flow originates. Location is related with network information, but focuses on geographic location derived from network information, application data, user authentication, and other data contents. Data refers to real data content carried in network traffic packets (e.g., network traffic flow).

Figure 1:
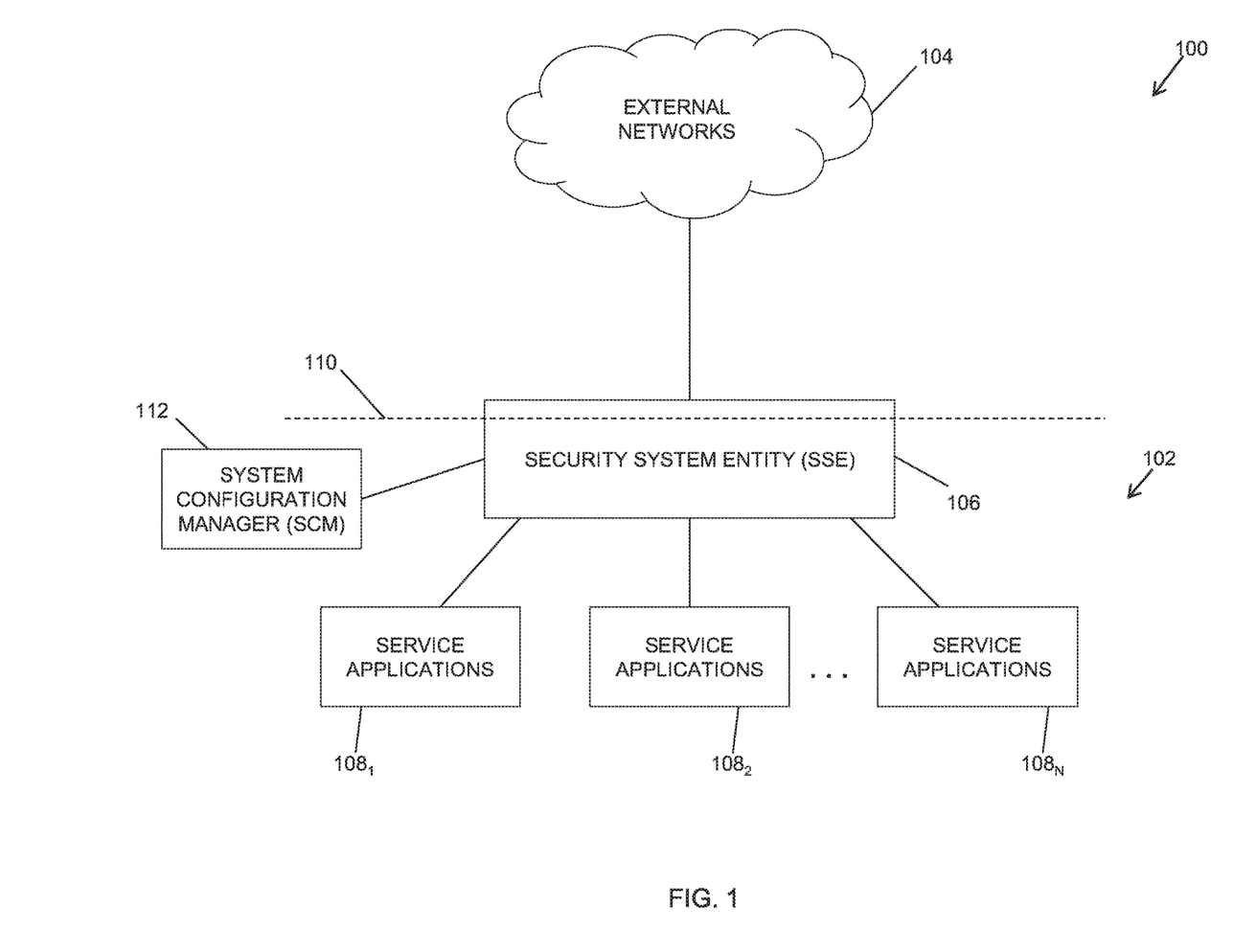
FIG. 1 is a block diagram illustrating an exemplary network for dynamically remediating a security system entity according to an embodiment of the subject matter described herein.

FIG. 1 is a block diagram illustrating an exemplary network communications environment 100 that is configured to facilitate the communication of network traffic flows (e.g., packet and/or frame traffic) among its network nodes. As shown in FIG. 1, a top portion of network communications environment 100 includes a plurality of external networks 104 that can be characterized as an untrusted domain. In contrast, the bottom portion of network communications environment 100 includes a trusted domain 102, which may comprise a trusted network and its service applications 108. As used herein, a trusted network is a network that is supported and protected by the SSE 106, such that communications originating from the trusted network and/or the trusted domain are largely considered to be reliable and/or uncompromised. Notably, the trusted domain 102 and the trusted network are logically separated from external networks 104 by a secure boundary 110 that is implemented by a security system entity (SSE) 106.

As shown in FIG. 1, SSE 106 is positioned at a network edge that may coincide with secure boundary 110 and provides security support to the plurality of trusted network service applications 108 (e.g., enterprise network applications) hosted the trusted domain 102. In some embodiments, SSE 106 may include a physical security gateway device (e.g., a secure Internet gateway), firewall device, or the like. Similarly, SSE 106 may be embodied as a software function configured to perform network traffic security gateway functions, firewall functions, or secure Internet gateway functions.

As shown in FIG. 1, network communications environment 100 includes a system configuration manager 112 that is communicatively connected to SSE 106. In some embodiments, system configuration manager 112 can be used by a system administrator as a user interface means to access and/or manage the operations of SSE 106. System configuration manager 112 may also be adapted to receive security policies intended for a trusted network and subsequently generate a corresponding security configuration(s) that is useable by SSE 106. For example, security policies defining security measures for an enterprise system (e.g., trusted domain 102) can initially be supplied to system configuration manager 112. System configuration manager 112 may be adapted to generate a security configuration, which in turn is provided to SSE 106 as input. In some embodiments, the security configuration may include various system configuration parameters or items that designate a certain level of access and that can be adjusted for a particular user, a particular user device, a particular network or location, a particular application, and/or a particular time period by which a user's access to service applications 108 is permitted by SSE 106. The security configuration input can also specify aspects or parameters pertaining to content control. In particular, the content control configuration parameters can specify the particular network addresses (e.g., associated protocols/services) and application data that can traverse (e.g., enter and exit) the configured SSE 106. Lastly, the security configuration input can specify a particular level of service availability by designating the bandwidth management and quality of service (QoS), thereby guaranteeing service availability to users communicating packets through SSE 106.

Figure 2:
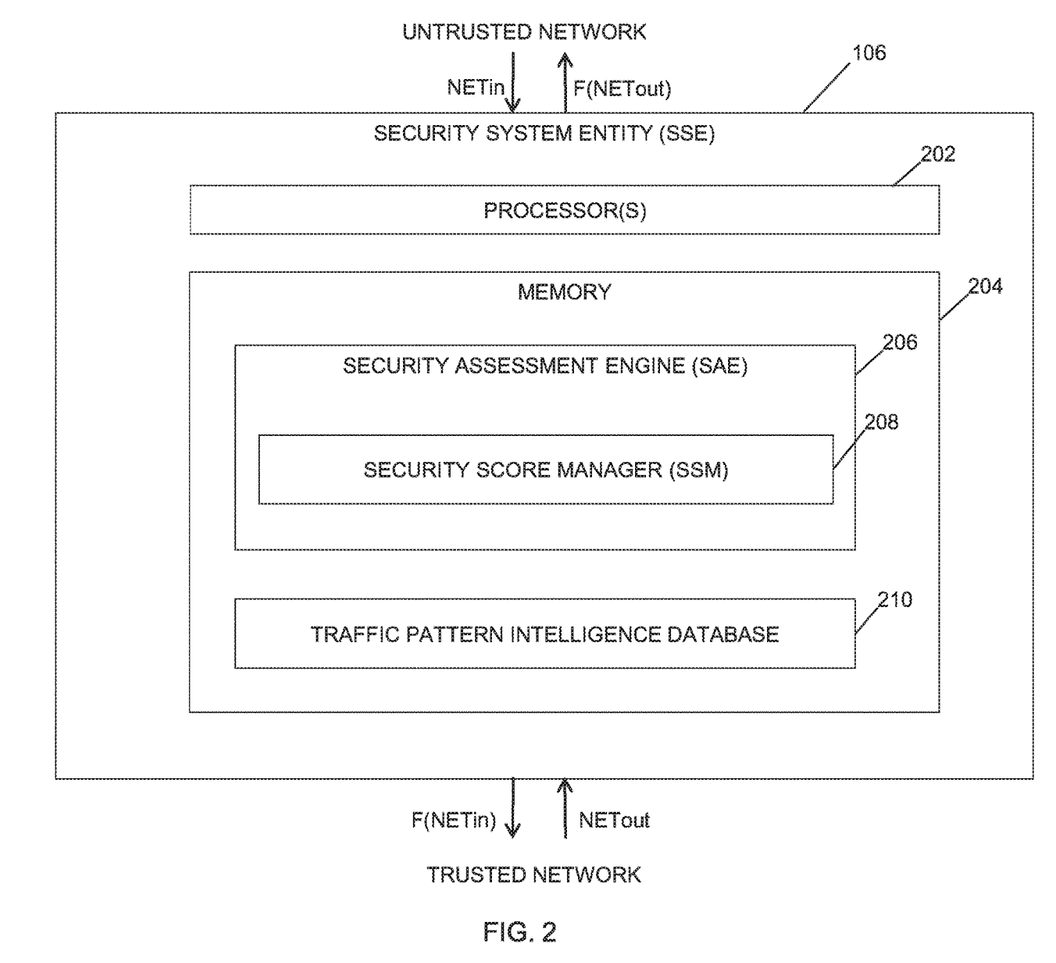
FIG. 2 is a block diagram illustrating an exemplary security system entity according to an embodiment of the subject matter described herein.

FIG. 2 is a block diagram illustrating an exemplary security system entity according to an embodiment of the subject matter described herein. As shown in FIG. 2, SSE 106 may include one or more processors 202, such as a central processing unit (e.g., a single core or multiple processing cores), a microprocessor, a microcontroller, a network processor, an application-specific integrated circuit (ASIC), or the like. SSE 106 may also include memory 204. Memory 204 may comprise random access memory (RAM), flash memory, a magnetic disk storage drive, and the like. In some embodiments, memory 204 may be configured to store a security assessment engine (SAE) 206 and a known threat intelligence database 210. Notably, SAE 206 stored in memory 204 can perform various monitoring, management, and/or remediation functionalities for SSE 106 when executed by one or more processors 202.

In some embodiments, SAE 206 comprises data analytics technology that can be employed to examine vast arrays of behavior data signals received by SSE 106. SAE 206 may also have access to a known threat intelligence database 210 that contains records of attack tools, attack techniques, attacking procedures, and attack signatures. The threat intelligence database 210 can also be provisioned with host IP addresses or other network location reputations. In some embodiments, SAE 206 utilizes the data maintained in the threat intelligence database 210 in conjunction with network traffic characteristics to evaluate the security status of network traffic flows traversing SSE 106.

After SSE 106 is configured and is operating in network communications environment 100, SSE 106 can process various types of network packet traffic in real-time. For example, the real-time network traffic flows received by SSE 106 are subsequently used to generate real data knowledge and/or intelligence as to the type of network traffic that is allowed or blocked. Further, SSE 106 can be adapted to generate real data pertaining to the bandwidth consumption, the quality of service (QoS) for offered application services, and the like. Using machine learning intelligence, an overall dynamic security score will be generated with the real traffic process results by the SSM 208 and/or SAE 206.

In some embodiments, SAE 206 is configured to determine an "overall security score" for SSE 106 that comprises both a static security score and a dynamic security score. For example, SAE 206 can be adapted to initially determine a static security score by analyzing the security configuration (and/or underlying security policies) of SSE 106. In some embodiments, SAE 206 includes a function (e.g., "F(X)") that is based on the security configuration provisioned on SSE 106 and can be used to conduct security configuration policy analysis on traversing network traffic flows (e.g., determine what network traffic flows received by SSE 106 are permitted to exit the SSE 106). For example, a security configuration policy analysis conducted by SAE 206 can determine a relationship between the network traffic flow received by SSE 106 from the untrusted domain (i.e., NETin) with the processed network traffic flow that is permitted to enter the trusted domain 102 via SSE 106 (e.g., F(NETin)). Similarly, SAE 206 can calculate a relationship between the network traffic flows that is received by SSE 106 from trusted domain 102 (e.g., NETout) with the processed network traffic flows that are permitted to leave SSE 106 (e.g., F(NETout)) in the same manner. For example, SAE 206 can determine a difference or "spread" that respectively exists between i) NETin and F(NETin) and ii) NETout and F(NETout) and its effect on the static security score associated with SSE 106. Notably, the larger the spread (e.g., F(x)<x) existing between the network traffic flows that are received and permitted by SSE 106, the greater the static security score that is defined by SAE 206. In some embodiments, the static score can be determined by the SAE 206 as follows: STATIC SCORE=100−[(F(NETin)/NETin)*100].

In some embodiments, SAE 206 can be configured to investigate the system kernel and network layer status of SSE 106 in order to assess any security vulnerabilities. SAE 206 is also adapted to check on the ciphers configured or any exposed surface interfaces. After conducting these checks, SAE 206 utilizes a security score manager (SSM) 208 to generate a static security score for the current configuration and system set up of SSE 106. In some embodiments, SSM 208 is a component of SAE 206 that may be configured to compute the overall security score, the static security score, and/or the dynamic security score of SSE 106.

For example, SAE 206 is configured to receive a security system configuration (provided to SSE 106 as input from system configuration manager 112) and subsequently assess various configuration parameters to determine an associated static security score for SSE 106. For example, SAE 206 can be configured to investigate system configuration parameters of SSE 106 including, but not limited to, i) system kernel security status, ii) network setup, iii) security parameters of an exposed service interface, iv) system resource controls, and v) security ciphers and algorithms. SAE 206 can also be adapted to monitor network traffic flows (i.e., traffic permitted to traverse through SSE 106) based on threat/traffic pattern intelligence as well as allowed network traffic flow volume and duration. Notably, SAE 206 can be configured to process these parameters in order to generate a static security score for SSE 106. In some embodiments, the static security score can be determined by the SAE 206 as follows: Static Security Score=Normalized (SSE Software Analysis Score+SSE configuration Analysis Score).

In some embodiments, SAE 206 formulates a static security score which serves as both an indication of the configuration security of SSE 106 and a means to dynamically monitor security configuration changes to SSE 106. SAE 206 can be configured to utilize security tools and protocol analysis and security policy filter function analysis in order to derive the static security score. For example, if SSE 106 utilizes a web interface that is not configured with HTTPS, SAE 206 may be configured to reduce or decrease the static security score and indicate that the use of HTTPS is recommended for SSE 106. Similarly, if HTTPS is configured on SSE 106, SAE 206 may also decrease the static security score if a weak TLS protocol (e.g., TLS1.0 or TLS1.1) is being utilized by SSE 106. In such a scenario, SAE 206 can attempt to remedy this deficiency by issuing a recommendation for TLS1.2 protocol. Further, if a new configuration change is made to the security system configuration of SSE 106, SAE 206 can recalculate the static security score and issue an alert to a system operator that SSE 106 has become more secure (or, alternatively, less secure). SAE 206 may be adapted to provide specific reasons for the detected change in the system security level along with a related recommendation. In some embodiments, SAE 206 (and/or SSM 208) is configured to generate a static security score ranging between "0" and "100" based on its static security configuration analysis.

As indicated above, SAE 206 can perform 'security policy filter function analyses as a means to compute at least a portion of the static security score of SSE 106. Notably, every security policy configured on SSE 106 can be characterized as a restrictive function. For example, these security policies can be designed to deny passage of certain network traffic flows that are received and identified by SSE 106. The remaining traffic flows are permitted to enter the trusted domain by the SSE 106. For example, if "U" represents all of the network traffic that is received by SSE 106 and if "A" represents the network traffic that is allowed to pass though SSE 106 by the provisioned security configuration, then SAE 206 can be configured to determine an overall static security score that is equal to [(Security Tools and Protocol Score+(100−100*A/U)]/2. Notably, the 'Security Tools and Protocol Score' is the portion of the security score calculated from security tool and protocol analysis as mentioned above.

As indicated above, the overall security score further includes the computing of a dynamic security score. In some embodiments, SAE 206 is configured to produce two separate dynamic security scores that are based on real dynamic traffic received by SSE 106. Notably, SAE 206 may generate a first dynamic security score that is based on untrusted ingress packet traffic flows generated by untrusted sources (e.g., in external networks 104) and received by SSE 106. Further, SSM 208 may generate a second dynamic security score that is based on trusted ingress packet traffic flows received by SSE 106 from trusted sources within the trusted domain 102 (e.g., the supported trusted enterprise network). After using SSM 208 to compute the first and second dynamic security scores, SAE 206 (and/or SSM 208) may combine these two dynamic security scores together in order to compute and report a single overall dynamic security score for SSE 106.

In some embodiments, SAE 206 can be configured to use SSM 208 to determine a first dynamic security score by investigating ingress traffic flow packets (e.g., parameters contained in the received network traffic flow packets) including, but not limited to, i) packets with attacking signatures, ii) packets with attacking tools, iii) packets exhibiting malware patterns, iv) reconnaissance scan packets, v) repeating invalid packets, vi) penetration attack packets, vii) replay packets, viii) authentication failure packets, and ix) spoofing packets. Notably, SAE 206 can be configured to process ingress network traffic flows from untrusted sources (e.g., incoming packet traffic from the untrusted domain) and execute SSM 208 to determine the first dynamic security score. In some embodiments, SAE 206 is configured to determine the first dynamic security score by inspecting each of the abstraction layers of the received ingress network traffic flows to derive a traffic diversity index (as described below).

In addition to using SSM 208 to determine this first dynamic security score for traffic initiated from untrusted sources, SAE 206 can be configured to determine a second dynamic security score by similarly investigating packets and/or parameters contained in network traffic packets originating from sources in trusted domains. For example, if a network traffic flow originates from the trusted domain, the traffic flow may be designated as being less likely to be suspicious and/or malicious. However, network traffic that originates from the trusted domain does not completely guarantee that the traffic flow is safe. For example, suspicious network traffic can be sent from a malicious insider (i.e., a user operating within the trusted domain 102). Alternatively, an enterprise network in the trusted domain 102 could be compromised and used as an attacking point or functioning as a botnet. In other embodiments, SAE 206 may be configured to provide additional security for traffic originating in a trusted domain. For example, SAE 206 can be adapted to examine sensitive data for data protection or data loss prevention (DLP).

In some embodiments, SAE 206 can be configured to determine the second dynamic security score by investigating packets and/or parameters contained in egress network traffic flow packets (i.e., traffic flowing from the trusted domain to the untrusted domain via the SSE) including, but not limited to, i) attacking signatures, ii) attacking tools, iii) attacking botnet(s), iv) sensitive data, v) suspicious DNS packets, vi) packets from an invalid network, vii) suspicious unsolicited packets, and vii) weakly protected packets. Notably, SAE 206 can be configured to process egress network traffic flows from trusted sources (e.g., packet traffic from the trusted domain to the untrusted domain via the SSE) to determine a second dynamic security score. In some embodiments, SAE 206 can assign equal weights to each of these parameters for its determination of the second dynamic security score. In some embodiments, SAE 206 is configured to determine the second dynamic security score by inspecting each of the abstraction layers of the received ingress network traffic flows to derive a traffic diversity index (as described below).

In some embodiments, SAE 206 (and/or SSM 208) can subsequently combine the first and second dynamic security scores determined by SSM 208 in order to determine a single overall dynamic security score for SSE 106. Due to the nature of the dynamic packet traffic received by the SSE 106, SAE 206 may be configured to periodically update the dynamic security score in accordance with predefined time intervals. Notably, these predefined time intervals can be established by a system administrator enable the SAE 206 to ascertain an overall dynamic security score based on manageable and frequent time periods of network packet traffic investigation. For example, SAE 206 can be configured to establish a monitoring session of a designated length of time that comprises a plurality of recurring predefined time intervals (e.g., a session of ten (10) hours comprising repeating five (5) minute predefined time intervals).

After establishing a baseline dynamic security score, SAE 206 can be configured to utilize a periodically calculated dynamic security score for frequent comparison in order to enhance the system security of SSE 106. For example, SAE 206 can analyze network traffic flows that are received by SSE 106 in real time. After a predefined time interval expires, SAE 206 is configured to use SSM 208 to calculate a diversity index (DI) for the types of network traffic coming through SSE 106. Based on the calculated dynamic security score and its comparison with the baseline dynamic security score, SAE 206 is able to assess and remedy (if necessary) the security configuration of SSE 106. For example, the detection of a sudden increase in the diversity index by SAE 206 will result in the reduction in the dynamic security score, thereby indicating that SSE 106 is less secure. As such, SAE 206 can implement more restrictive rules to decrease the diversity index by delaying or dropping the suspicious network traffic (e.g., less known network traffic) that is causing the increase in the measured diversity index. Notably, this remedial action performed by SAE 206 can prevent many distributed denial-of-service (DDOS) attacks in current network environments.

In some embodiments, SAE 206 and/or SSM 208 can be configured to calculate a traffic diversity index (DI) for SSE 106 as an initial step to computing a dynamic security score. As used herein, the diversity index is part of the dynamic security score that is measured by observing the network traffic flows that are received by SSE 106 on the external network interface (e.g., untrusted domain side) and the internal network interface (e.g., trusted domain side). Notably, such monitoring and computation by SAE 206 is conducted on a continuous basis at specific time intervals that are predefined by the system administrator. For example, the predefined time interval can be as small as possible based on the available compute and storage resources of SSE 106. In some embodiments, SAE 206 classifies the received network traffic flows by mapping the traffic to various network abstraction layers, for example, as defined by the Open Systems Interconnection (OSI) model stack. In some embodiments, SAE 206 can be configured to assess the media access control (MAC) address, IP address, port/protocol, session, and/or application related to the network traffic flows traversing SSE 106. In some embodiments, SAE 206 can also map the network traffic flows to a user, time, and location of origination (if determined).

As an illustrative example, SAE 206 can utilize a time interval or time period (e.g., predefined by a system administrator) that may be used to calculate a specific count value of various network traffic flow parameters (within the network traffic flows) that are present at each network abstraction layer of the network traffic flows traversing SSE 106. For example, SAE 206 can assess the number of different source MAC addresses (e.g., MAC addresses indicated in network traffic flow input received by SSE 106) and the number of different destination MAC addresses (e.g., MAC addresses indicated in network traffic flow output sent from SSE 106). SAE 206 determines a total sum of all these source and destination MAC addresses that are detected in the network traffic flows traversing SSE 106 during the predefined time interval.

During this same predefined time interval (i.e., when the MAC address total count was determined), SAE 206 also proceeds to determine the number of different source IP addresses and the number of destination IP addresses included in the network traffic flows traversing SSE 106. Notably, SAE 206 determines the sum total of these IP addresses during the predefined time interval.

Likewise, at the transport layer (e.g., port/protocol layer), SAE 206 is configured to determine the number of different protocols and the different ports (e.g., source port and destination port) used by SSE 106 to communicate network traffic during the same aforementioned predefined time interval.

At the session layer, SAE 206 determines the total sum of live sessions that are being handled by SSE 106 during the predefined time period. For example, SAE 206 will calculate the number of live sessions that are originating from the trusted domain and the number of live sessions that are originating from the untrusted domain during the predefined time interval.

At the application layer, SAE 206 determines the total sum of the number of different applications types used by and/or corresponding to the network traffic flows traversing SSE 106 during the predefined time interval.

If association of application to a user can be established, SAE 206 determines the total sum of different users associated with the network traffic flows that traverse SSE 106 during the predefined time interval.

If the mapping of network data to location can be established, SAE 206 determines the total number of originating locations from where the network traffic flows are received by SSE 106 during the predefined time intervals.

After SAE 206 determines the sum totals at each of the abstraction layers as described above for a particular predefined time period, SAE 206 may be configured to initiate a new predefined time interval. For example, SAE 206 is configured to synchronize a network time at SSE 106 for reference and for determining each of a plurality of recurring predefined time intervals. Notably, SAE 206 is adapted to continuously take a snapshot at each predefined time interval of the network traffic data traversing both the external network interface(s) and internal network interface(s) of SSE 106. As indicated above, SAE 206 is configured to calculate a diversity index using the snapshot of the network traffic data at the external and internal network interfaces of SSE 106. Specifically, a separate diversity score "D" for each network layer is calculated by SSM 208 and/or SAE 206. In some embodiments, the diversity index for each abstraction layer can be computed as:

$$D = \frac{\sum n(n-1)}{N(N-1)}.$$

Notably, each of the "n" variable and "N" variable represents a different number of entities depending on the network layer that is being assessed. For example, for the MAC layer, "n" can represent the total number of MAC addresses observed by the SSE while "N" represents the total number of MAC addresses possible. In contrast, for the transport layer, "n" can represent the total number of IP addresses observed at the SSE while "N" represents the total number of IP addresses possible. The same is true for the determination of the values of n and N for the data points existing at the remaining layers.

After calculating the diversity index "D" for each layer, SAE 206 computes the cumulative diversity index (CDI) by summing the normalized individual diversity indexes and dividing by the total number of corresponding layers. In some embodiments, SAE 206 can use the following formula to calculate the cumulative diversity index.

CDI=[Normalized($D_1$)+Normalized($D_2$)+ . . . +Normalized($D_M$)]/$M$

Notably, the variable "M" refers to the number of normalized diversity indexes that is calculated by SAE 206. Further, the diversity index is inversely proportional to the dynamic security score which can be calculated as follows:

Dynamic Security Score=100−Cumulative$DI$

In some embodiments, SAE 206 is configured to generate a final security score. Namely, for a deployed/operational SSE 106 that is configured with a security configuration, a pair of security scores is produced by SAE 206. In particular, SAE 206 generates a static security score and an overall dynamic security score (which comprises the first and second dynamic security scores mentioned above). In some embodiments, each of the static security score and the overall dynamic security score will be quantified between "0" and "100", where a "0" score represents no protection and a "100" score represents perfect/complete protection. In the event, SAE 206 detects a change made to the security configuration of SSE 106, SAE 206 is adapted to generate a report that indicates SSE 106 is becoming more secure or less secure.

If SAE 206 detects that the static security score is below a particular threshold, SAE 206 determines that SSE 106 is statically configured in an unsecured manner. Alternatively, if SAE 206 determines that the overall dynamic security score falls below a particular threshold and thus is contributing towards the deficiency of the overall security score, SAE 206 determines that SSE 106 is susceptible to an attack. In the event the overall security score falls below a predetermined threshold, SAE 206 determines that a more secure configuration is required to maintain an appropriate security status for SSE 106.

In some embodiments, SAE 206 can be configured to conduct an automatic security configuration adaptation process in the event a security self-protection mode is enabled. For example, SAE 206 can be configured to execute proper auto-configuration changes in order to undo a detected degradation of the SSE's security score. Notably, if SAE 206 detects the security score to be declining due to certain detected network traffic patterns, SAE 206 can attempt to increase the security score back to normal by automatically changing the security configuration policies such that the new data traffic patterns are blocked.

SAE 206 can also be configured to conduct security logging and audit functionalities that include logging network data traffic patterns that cause a security score to decline. These network data traffic patterns can be stored in a database 210 of SSE 106. SAE 206 can also record any dynamic configuration change actions in which it takes to maintain or enhance the security of SSE 106. These network traffic patterns can be made part of a supervised learning system where human input aids the identification of these traffic patterns as either malicious or benign.

In some embodiments, SAE 206 is configured to determine a dynamic security score. Notably, SAE 206 is configured to determine a traffic diversity index value by assessing traffic characteristics exhibited at different abstraction layers. Internet protocol communications, according to the OSI model for example, is composed of seven layers: the physical layer, the data link layer, the network layer, the transport layer, the session layer, the presentation layer, and the application layer. With the exception of the physical layer, SAE 206 utilizes information obtained from each of the other six layers in addition to traffic characteristics associated with network traffic monitored by SSE 106. In particular, the greater the diversity index value, the broader the type of network traffic that is permitted to traverse the SSE 106. Furthermore, the greater the diversity index value, the less secure the SSE 106. Notably, the traffic diversity index is inversely related with the dynamic security score (e.g., dynamic security score=100−Diversity Index value). In addition, SAE 206 can be configured to monitor for sudden increases or decreases of a diversity index to assess the security of a system. For example, a sudden diversity index increase could be a reliable indication that the SSE is either under attack or subjected to a reconnaissance scan for weakness. Such an increase in the diversity index score would result in a drop in the dynamic security score, thereby alerting the SSE and/or user to take proper remedial action(s). In some embodiments, SAE 206 may initiate a remedial action that reverts the SSE to a previously approved security configuration state. In other embodiments, SAE 206 can be configured to execute i) an automatic patching of the SSE software, ii) disable the connection(s) of the SSE to the external network, iii) initiate a network traffic recording for subsequent forensic analysis, iv) auto-block certain types of network traffic flows, and/or the like. For example, many of the systems (e.g., systems positioned in the trusted domain) could possibly be compromised and used as part of Botnet for DDOS attacks (e.g., a Botnet DNS DDOS attack). In this scenario, the engine would detect a sudden increase in the Diversity Index (DI) for DNS requests and cause dynamic security score to drop. The auto-remediation action executed by SAE 206 is configured to block these DNS requests. Further, the databases located in the trusted domain could be compromised such that a large amount of user information could be sent out of the trusted. In such a scenario, the engine would detect a sudden increase in the DI for this layer (of network traffic flow processing). After detecting the sudden increase (e.g., the value of the D1 exceeds a predefined threshold value), SAE 206 may subsequently execute an auto-remediation action that blocks the packets of the network traffic flow from leaving the trusted network (e.g., data loss prevention).

Figure 3A:
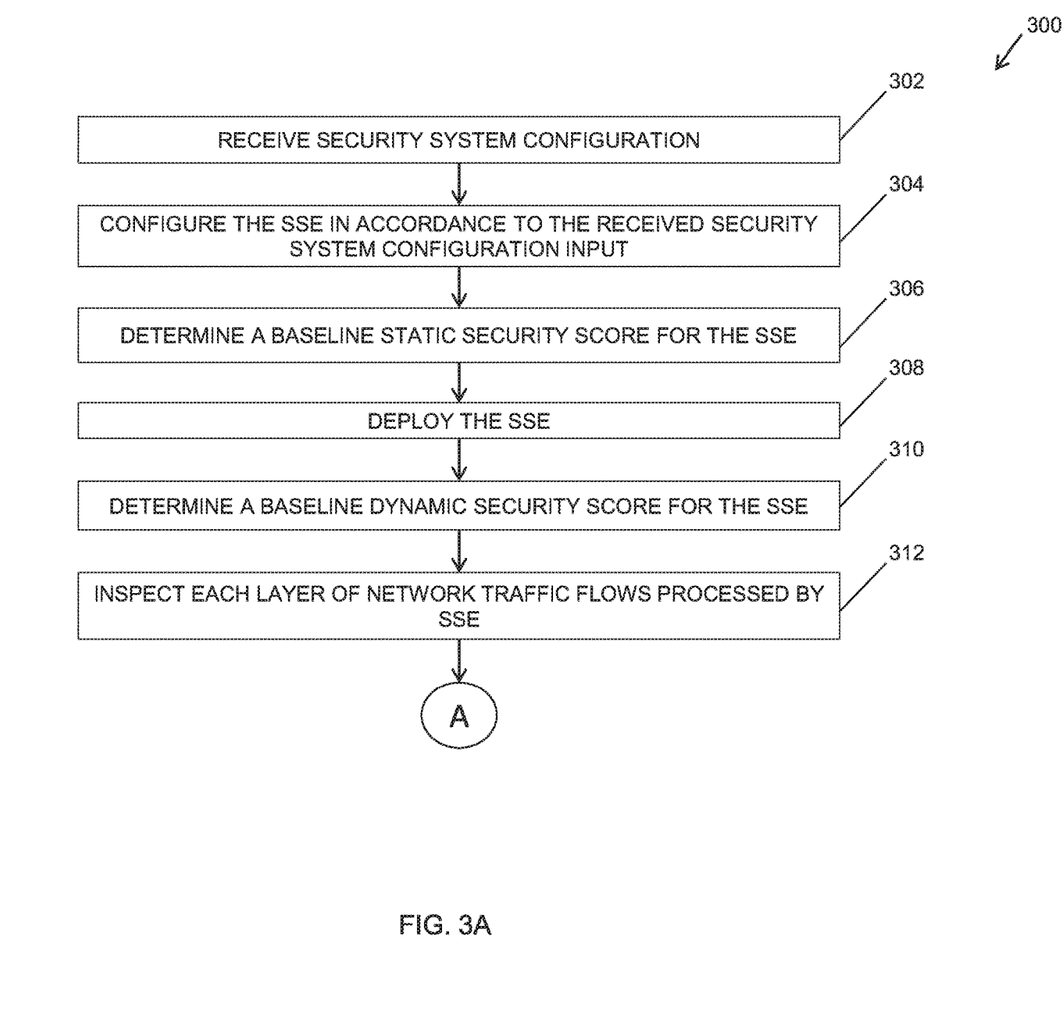
FIGS. 3A and 3B is a flow chart illustrating an exemplary process for dynamically remediating a security system entity according to an embodiment of the subject matter described herein.
Figure 3B:
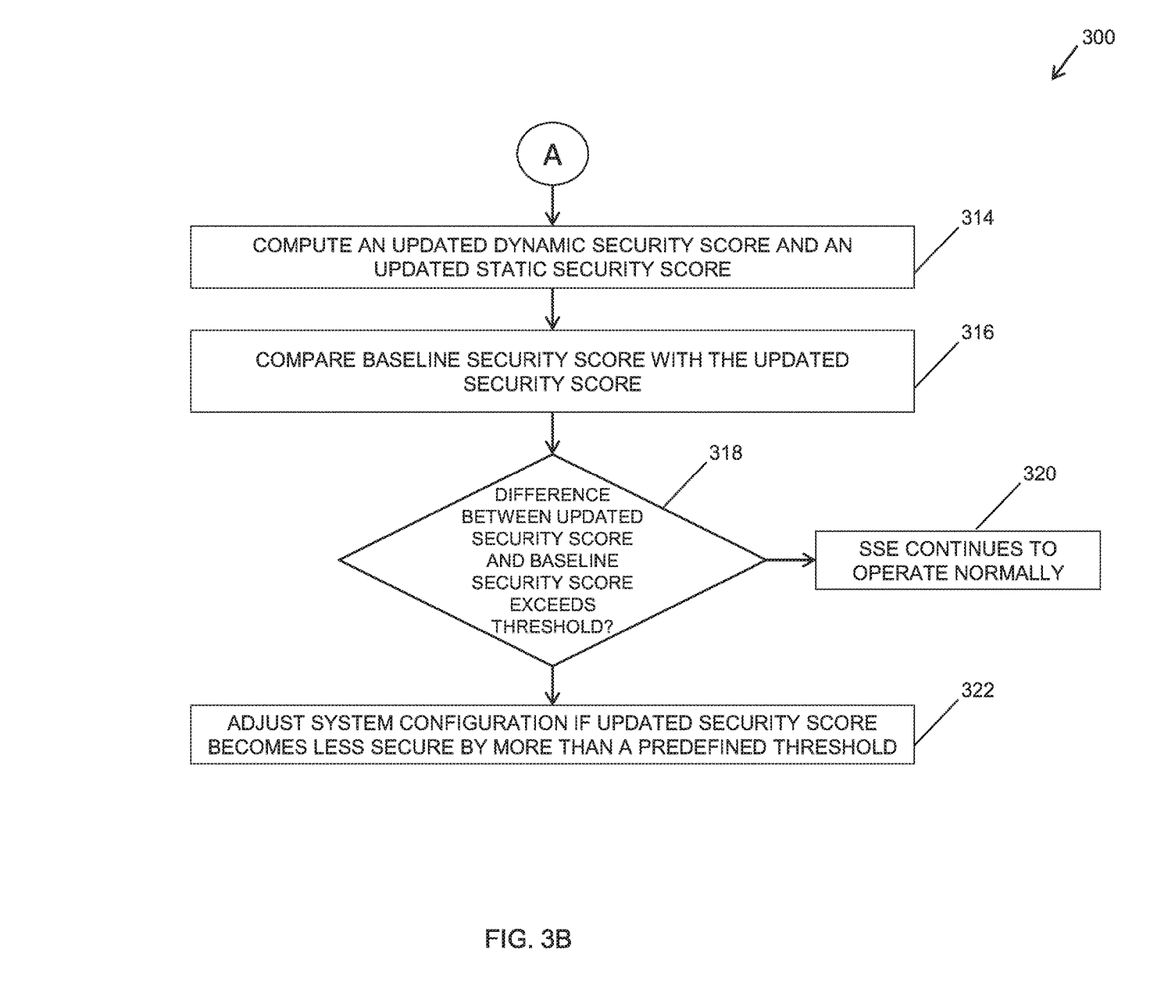

FIGS. 3A and 3B is a flow chart illustrating an exemplary process or method 300 for dynamically remediating a security system entity according to an embodiment of the subject matter described herein. In some embodiments, method 300 depicted in FIGS. 3A and 3B is an algorithm stored in memory that when executed by a hardware processor performs one or more of blocks 302-320.

In block 302, a security system configuration is received. In some embodiments, an SSE is communicatively connected to, and receives a security system configuration from, a system configuration manager. For example, a system administrator may enter a number of security policies that are converted into a security system configuration by the system configuration manager. The resulting security system configuration is subsequently delivered to the SSE.

In block 304, the SSE is configured in accordance to the received security system configuration. In some embodiments, the SSE received the security system configuration as input and configures its underlying hardware and software components in accordance to the security configuration parameters specified in the security system configuration.

In block 306, the SAE determines a baseline static security score for the SSE. In some embodiments, the SAE can be configured to investigate the system kernel, any configured ciphers, and the exposed service interfaces (e.g., external network interface and internal network interface) of SSE that result from the implemented security system configuration. The SAE can also utilize traffic pattern intelligence to check what network traffic flows are allowed or blocked at the SSE. After processing the resulting configuration, the SAE generates a baseline static security score.

In block 308, the SSE is deployed and begins receiving network traffic flows. In some embodiments, SSE uses the SAE to begin to monitor the static configuration and analyze network traffic flows traversing the SSE via the external network and internal network interfaces. After the SSE has been deployed for a period of time (e.g., as defined by the system administrator), a baseline dynamic security score can be determined by monitoring the network traffic flows departing the interfaces of SSE (e.g., an internal network interface permitting network traffic flows into the trusted network from the SSE and an external network interface permitting network traffic flows into the trusted network from the SSE). In some embodiments, a baseline security score is determined using only the network traffic flows originating from an untrusted network to the trusted network via the SSE. In other embodiments, the baseline dynamic security score is based on network traffic flows that are communicated to the untrusted network from the trusted network via the SSE (i.e., network traffic flows that are received from the trusted network and permitted to traverse the SSE).

In block 310, the SAE inspects each of the abstraction layers of network traffic flows that are allowed to traverse through the SSE. After a predetermined time period, the SAE can be configured to determine a baseline dynamic security score. In some embodiments, the SAE inspects the network traffic flows entering the trusted domain via the SSE (e.g., at the internal network interface), the network traffic flows exiting the trusted domain into the untrusted domain via the SSE (e.g., at the external network interface), or both. In particular, the SAE inspects the network traffic flows for configuration items as specified by the security configuration at each of the MAC layer, the IP layer, the network layer, the session layer, the application layer, and the user layer. The SAE is further configured to inspect the network traffic flows at a location layer to determine the location from where the network traffic flow originated as well as inspecting the network traffic flows for a current time.

In block 312, the SAE calculates a cumulative traffic diversity index based on the permitted network traffic flows. In some embodiments, the SAE computes a diversity index by determining a separate diversity score for each network layer. After determining the plurality of diversity indexes, the SAE and/or its SSC normalizes each of the plurality of individual diversity indexes and subsequently computes a cumulative diversity index (as described above).

In block 314, the SAE and/or SSC calculates an updated dynamic security score. In some embodiments, the SAE and/or SSC can be configured to calculate the updated dynamic security score using the computed cumulative diversity index. Notably, the diversity index is inversely proportional to the dynamic security score which can be calculated by the SAE and/or SSC as the difference between "100" and the cumulative diversity index (e.g., Dynamic security score=100-CDI). In some embodiments, the updated dynamic security score is determined using only the network traffic flows originating from an untrusted network to the trusted network via the SSE. In other embodiments, the updated dynamic security score is also based on network traffic flows that are communicated to the untrusted network from the trusted network via the SSE (i.e., network traffic flows that are received from the trusted network and permitted to traverse the SSE).

In block 316, the SAE is configured to compare the previously calculated baseline security score (i.e., the baseline overall security score for the SSE) with the updated security score (i.e., the updated overall security score for the SSE). If the SAE determines that the updated security score is more secure or at the same security level as the baseline security score, then method 300 proceeds to block 318 where the SSE continues to function normally (e.g., block 320). Otherwise, the message continues to block 322. In other embodiments, the updated security score is also based on network traffic flows that are communicated to the untrusted network from the trusted network via the SSE (i.e., network traffic flows that are received from the trusted network and permitted to traverse the SSE).

In some embodiments, the SAE can function on a more granular level and is configured to compare the previously calculated baseline static security score with an updated static security score determined in block 314 (as determined in block 314). Moreover, the SAE is also configured to compare the previously calculated baseline dynamic security score with the updated dynamic security score. If the SAE determines i) that the updated static security scores are more secure or at the same security level as the baseline static security score or ii) that the updated dynamic security score is more secure or at the same security level as the baseline dynamic security score, then continues to function normally. Otherwise, the method 300 continues to block 322.

In block 322, the SAE determines that an updated security score (e.g., the overall updated security score, the updated static security score, and/or the updated dynamic security score) is less secure if the updated security score differs from the respective baseline security score by a predefined threshold amount and subsequently takes measures to remedy the security configuration of the SSE. For example, the SAE makes this determination if the updated security score is simply less than the baseline security score or the difference between the two security scores exceeds a predefined threshold or range. In some embodiments, the SAE may alert a system administrator and/or take another remedial action.

Advantages of the subject matter described herein include the dynamic remediation of an SSE by focusing on the system's input and output. Instead of attempting to enforce security policies based on event management, the disclosed SAE using the network traffic flows to promptly detect a change or deficiency in security system configurations. Notably, the described remediation technique increases the rate at which any changes to a security system configuration and policy can be detected. In addition, such a measure ensures that an appropriate security policy at an SSE is always in effect. This can have an enormous impact on the cost of securing a network and applications as well as the damage inflicted by a security breach. As such, an SSE configured to dynamically remedy itself in such a manner is able to respond to identified suspicious messaging and/or prevent fraudulent attacks as described herein improves the technological field of computer network security by reducing the likelihood of fraud and other types of signaling attacks on computer networks in a more efficient manner.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method comprising:
   establishing a baseline security score for a security system entity (SSE) supporting a trusted network based on a security configuration of the SSE;
   receiving, by the SSE, ingress network traffic flows directed to the trusted network;
   determining an updated security score for the SSE based on the security configuration of the SSE and the ingress network traffic flows that are permitted into the trusted network via the SSE; and
   dynamically remediating the SSE via an automatic remedying of the security configuration of the SSE if the updated security score differs from the baseline security score by a predefined amount;
   wherein each of the baseline security score and the updated security score comprises a dynamic security score that is based on a plurality of traffic diversity indices that correspond to assessments of network traffic flow parameters existing at a respective plurality of different network abstraction layers of the received ingress network traffic flows.

2. The method of claim 1 wherein each of the baseline security score and the updated security score further comprises a static security score.

3. The method of claim 2 wherein the updated security score for the SSE is based on the network traffic flows received from the trusted network and permitted to traverse the SSE.

4. The method of claim 1 wherein the SSE includes a system configuration manager that includes an interface used for providing the security configuration to the SSE.

5. The method of claim 1 wherein remedying the security configuration of the SSE includes reverting to a previously approved security configuration state.

6. The method of claim 1 wherein the SSE includes a secure Internet gateway, a firewall, or a network traffic security gateway function.

7. A system comprising:
   a security system entity (SSE) comprising at least one processor and memory; and
   a security assessment engine (SAE) stored in the memory and when executed by the at least one processor is configured for establishing a baseline security score for the SSE supporting a trusted network based on a security configuration of the SSE, processing ingress network traffic flows directed to the trusted network via the SSE, determining an updated security score for the SSE based on the security configuration of the SSE and a portion of the ingress network traffic flows that are permitted into the trusted network via the SSE, and dynamically remediating the SSE via an automatic remedying of the security configuration of the SSE if the updated security score differs from the baseline security score by a predefined amount,
   wherein each of the baseline security score and the updated security score comprises a dynamic security score that is based on a plurality of traffic diversity indices that correspond to assessments of network traffic flow parameters existing at a respective plurality of different network abstraction layers of the received ingress network traffic flows.

8. The system of claim 7 wherein each of the baseline security score and the updated security score comprises a static security score and the dynamic security score.

9. The system of claim 8 wherein the updated security score for the SSE is based on the network traffic flows received from the trusted network and permitted to traverse the SSE.

10. The system of claim 7 wherein the SSE includes a system configuration manager that includes an interface used for providing the security configuration to the SSE.

11. The system of claim 7 wherein remedying the security configuration of the SSE includes reverting to a previously approved security configuration state.

12. The system of claim 7 wherein the SSE includes a secure Internet gateway, a firewall, or a network traffic security gateway function.

13. A non-transitory computer readable medium having stored thereon executable instructions that when executed by a processor of a computer controls the computer to perform steps comprising:

establishing a baseline security score for a security system entity (SSE) supporting a trusted network based on a security configuration of the SSE;

receiving, by the SSE, ingress network traffic flows directed to the trusted network;

determining an updated security score for the SSE based on the security configuration of the SSE and a portion of the ingress network traffic flows that are permitted into the trusted network via the SSE; and dynamically remediating the SSE via an automatic remedying of the security configuration of the SSE if the updated security score differs from the baseline security score by a predefined amount;

wherein each of the baseline security score and the updated security score comprises a dynamic security score that is based on a plurality of traffic diversity indices that correspond to assessments of network traffic flow parameters existing at a respective plurality of different network abstraction layers of the received ingress network traffic flows.

14. The non-transitory computer readable medium of claim 13 wherein each of the baseline security score and the updated security score comprises a static security score and the dynamic security score.

15. The non-transitory computer readable medium of claim 14 wherein the updated security score for the SSE is based on the network traffic flows received from the trusted network and permitted to traverse the SSE.

16. The non-transitory computer readable medium of claim 13 wherein the SSE includes a system configuration manager that includes an interface used for providing the security configuration to the SSE.

17. The non-transitory computer readable medium of claim 13 wherein remedying the security configuration of the SSE includes reverting to a previously approved security configuration state.

* * * * *